Nov. 13, 1962　　　A. F. SMITH　　　3,063,661
DUCTED FAN ENGINE

Filed March 12, 1958　　　　　　　　　　3 Sheets-Sheet 1

INVENTOR
ALDEN F. SMITH
BY *Vernon F. Hauschild*
ATTORNEY

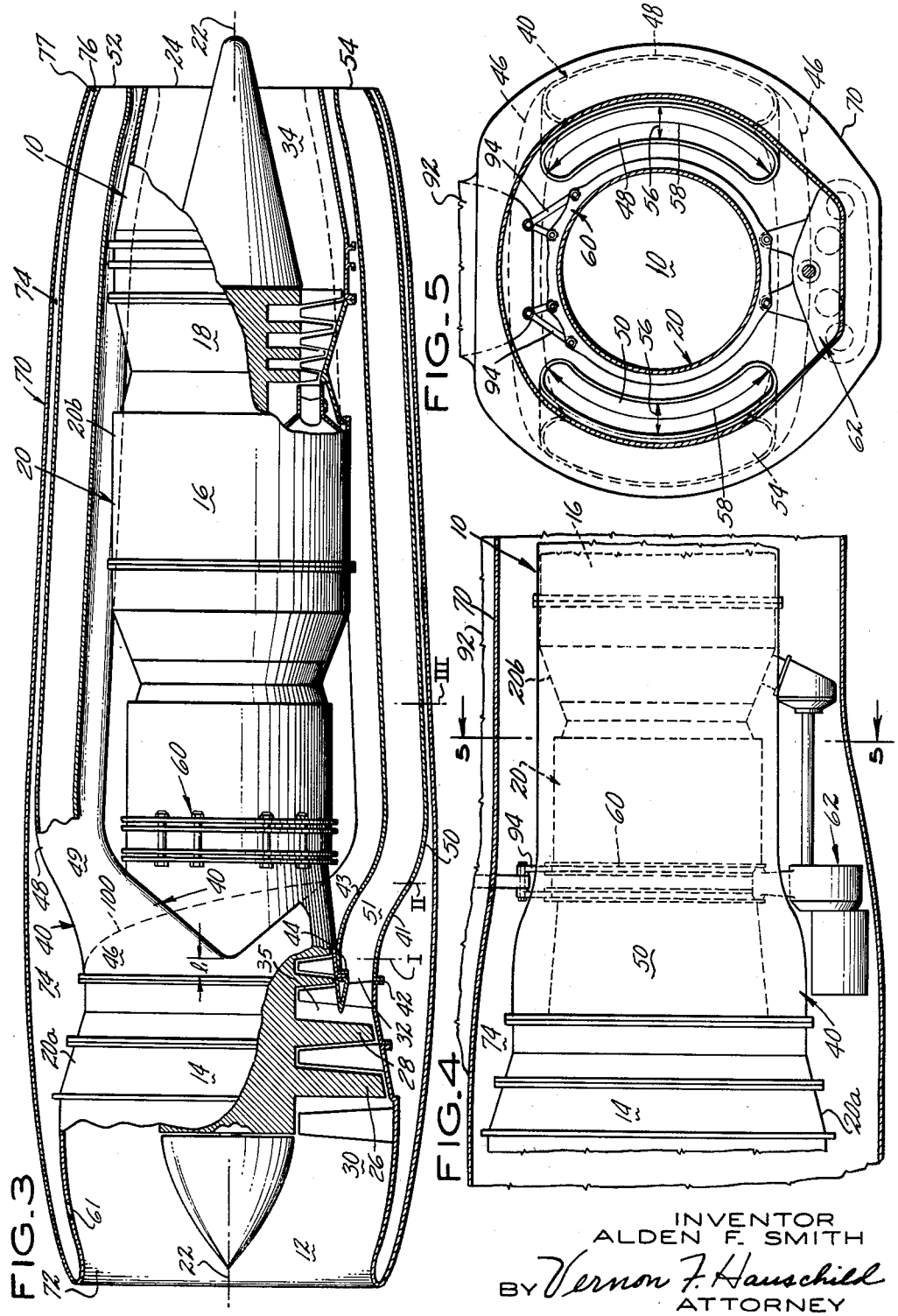

Nov. 13, 1962 A. F. SMITH 3,063,661
DUCTED FAN ENGINE
Filed March 12, 1958 3 Sheets-Sheet 3
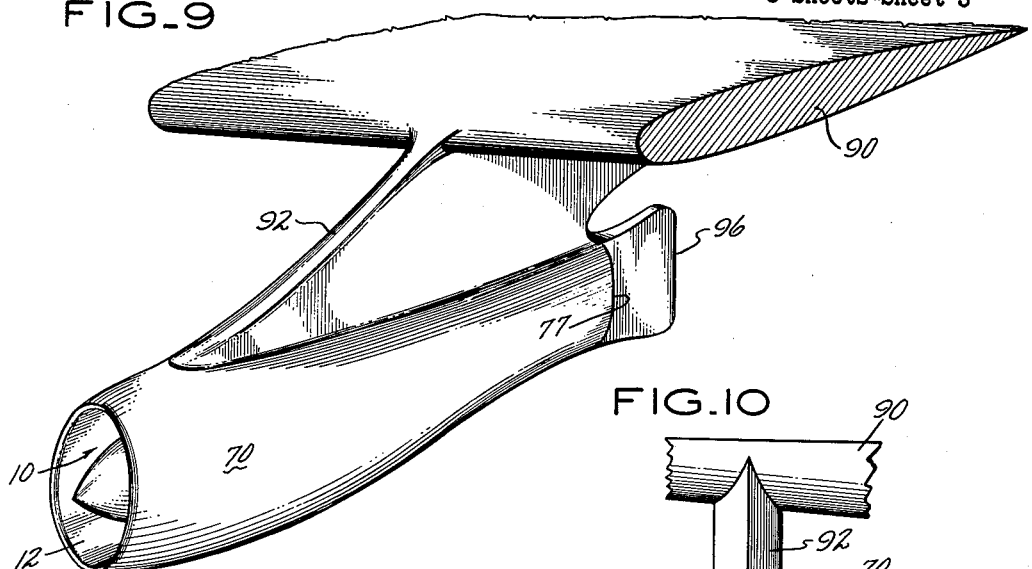
FIG.9
FIG.10
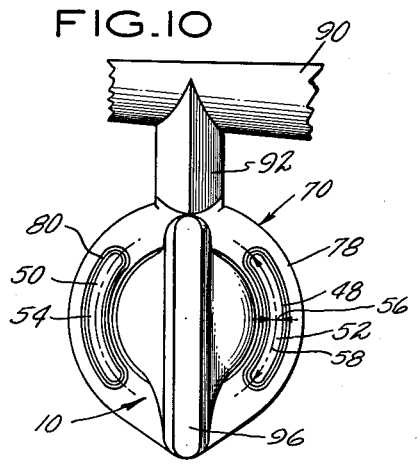
FIG.6
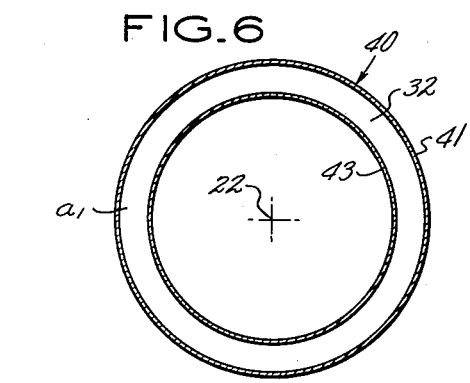
FIG.8
FIG.7
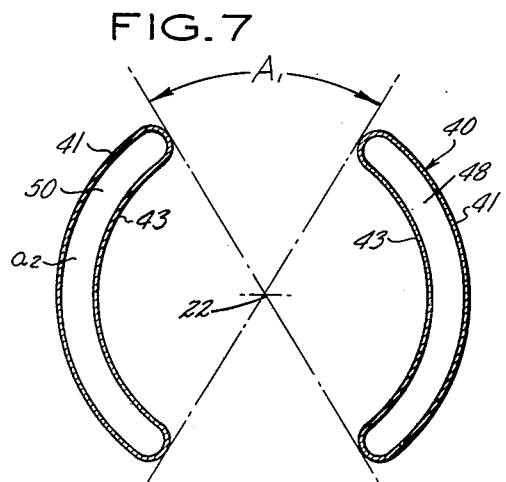
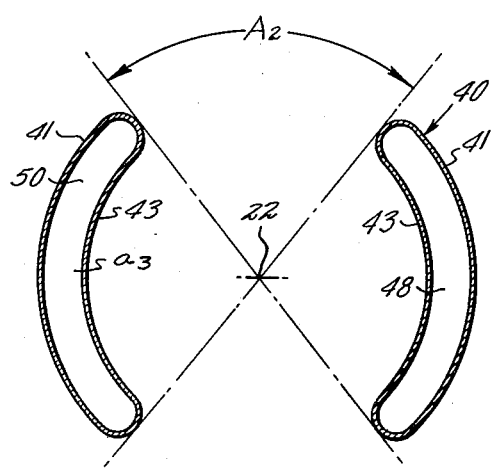
INVENTOR
ALDEN F. SMITH
BY Vernon F. Hauschild
ATTORNEY United States Patent Office 3,063,661
Patented Nov. 13, 1962

3,063,661
DUCTED FAN ENGINE
Alden F. Smith, Glastonbury, Conn., assignor to United
Aircraft Corporation, East Hartford, Conn., a corporation of Delaware
Filed Mar. 12, 1958, Ser. No. 721,050
4 Claims. (Cl. 244—54)

This invention relates to powerplants and more particularly to turbine fan engines of the type useable to propel modern aircraft.

In the past, it has not been possible to effectively utilize ducted fan engines as powerplants for modern aircraft because the extensive ducting systems used in conventional ducted fan engines are heavy in weight and completely envelop the remainder of the engine so that all accessibility to the engine through the airplane nacelle for required maintenance purposes is lost. Further, due to the engine ducting envelope in conventional ducted fan engines, severe problems are encountered in attempting to support the engine as the support means has to be passed through the engine enveloping duct, thereby destroying its gas tight quality. In addition to this, the flow losses encountered in passing the engine gases through the elongated conventional ducted fan passages of annular shape were such that the frontal area of the engine had to be increased to be able to receive sufficient air to compensate for these losses. The enveloping duct contouring necessary to enclose the normally externally mounted engine accessories increased the maximum engine radial dimension further. These increases in engine size necessitate corresponding increases in nacelle size so that the use of a conventional ducted fan engine greatly increases the size and weight of both the engine and airplane nacelle and the increased sizes would be accompanied by all of the aerodynamic and drag losses normally caused thereby.

It is an object of this invention to teach a ducted fan engine contruction which has all of the advantages of the usual ducted fan engine but which is light in weight, permits the use of a lightweight and small engine nacelle, permits accessibility to the engine throughout most of the engine length and which permits both top and bottom vertical access to the engine for virtually the entire engine length so that the engine may be supported at the engine 12 (10–2 preferably) o'clock position, if desired, and so that the engine accessories may be externally mounted at the conventional engine 6 (4–8 preferably) o'clock position with full access thereto.

It is a further object of this invention to teach a ducted fan engine in which the amount of ducting used is minimal and which has an annular inlet and two discharge ducts located on opposite sides of the engine, preferably at the 3 (2–4) o'clock and 9 (8–10) o'clock positions, and each of which diverges at its upstream end to reduce flow velocity and thereby reduce flow losses and culminates in a nozzle defining a slot having its major axis extending primarily in a vertical direction for noise suppression and noise directivity purposes.

It is a further object of this invention to teach a ducted fan engine configuration in which the ducting unit comprises a bifurcated duct having an annular inlet and two initially diverging passages located on opposite sides of the engine and each leading from the inlet to a discharge nozzle comprising an elongated slot communicating with the atmosphere.

Other objects and advantages will be apparent from the specification and claims, and from the accompanying drawings which illustrate an embodiment of the invention.

FIG. 3 is a plan view, partially broken away and in section, of my ducted fan engine with an airplane nacelle shown in section therewith.

FIG. 4 is a fragmentary side view of my ducted fan engine configuration shown in FIG. 3.

FIG. 5 is a showing of my ducted fan engine taken along line 5—5 of FIG. 4.

FIG. 6 is a cross-sectional showing through station I—I of FIG. 3.

FIG. 7 is a cross-sectional showing through station II—II of FIG. 3.

FIG. 8 is a cross-sectional showing through station III—III of FIG. 3.

FIG. 9 is a perspective showing of my ducted fan engine installed in an airplane nacelle and supported by a pylon or strut projecting from an aircraft wing.

FIG. 10 is a rear view of the FIG. 9 showing and illustrates a vertical slot exhaust outlet for a basic engine.

In a conventional turbojet aircraft engine, air passes through an aligned compressor, burner and turbine and is then discharged to atmosphere through an exhaust outlet to generate thrust. Generally speaking, a ducted fan engine adds the feature of taking a portion of engine air from an engine station such as the compressor and discharging it to atmosphere to generate thrust other than through the aforementioned exhaust outlet. In conventional ducted fan engine design, the additional duct is of circular cross section and envelops the engine to form an annular air passage therebetween. As explained more fully below, a ducted fan engine gives the advantage of increased thrust, increased propulsive efficiency and better fuel economy over a turbojet engine but, in the past, has had the disadvantage of engine non-accessibility, and prohibitive engine and nacelle weight and size. These disadvantages prevented taking advantage of increased air flow through the turbofan engine beyond the air flow capacity of a conventional turbojet engine without reducing the airplane pay load capacity below a practical limit.

The accepted formula for calculated thrust generated by a jet-type engine is:

$$F_n = \frac{W_a}{g}(V_j - V_a) \tag{1}$$

where $F_n$ is thrust, $W_a$ is air flow quantity, $V_j$ is the velocity of the jet and $V_a$ is the velocity of the airplane. The formula for propulsive efficiency is:

$$N_p = \frac{2}{1 + \frac{V_j}{V_a}} \tag{2}$$

Figure 1:
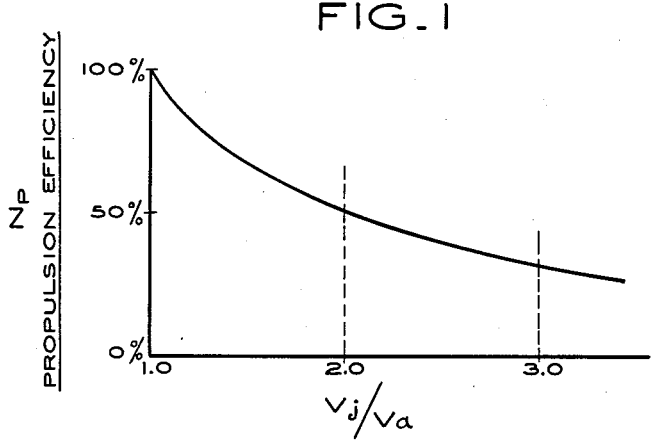
FIG. 1 is a graphic representation of engine propulsion efficiency ($N_p$) plotted against the ratio of jet velocity to airplane velocity ($V_j/V_a$).

It will be obvious by observing Formula 2 and the graph shown in FIG. 1 that optimum propulsive efficiency is attained when $V_j = V_a$. It will further be noted by referring to Formula 1 that, at this condition of optimum propulsive efficiency, no thrust is being generated by the engine. Accordingly, it is necessary to effect a compromise between propulsive efficiency and thrust generation, but such is easily accomplished for, by referring to Formula 1 we see that by taking advantage of the inherently higher air-flow capacity of a ducted fan engine over a conventional turbojet engine, we may substantially reduce our jet velocity $V_j$ without thrust loss, and the advantage gained by the reduced jet velocity $V_j$ is increased propulsive efficiency as shown in FIG. 1 and Formula 2.

Figure 2:
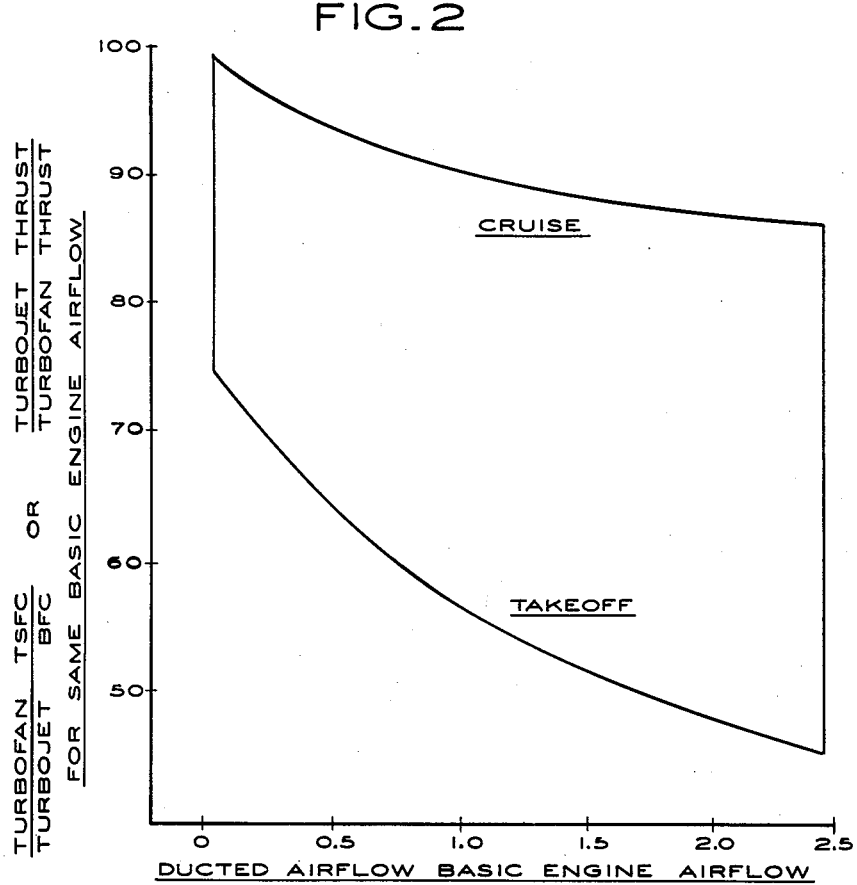
FIG. 2 is a graphic representation of a comparison of turbofan or ducted fan engine performance characteristics with similar performance characteristics of a conventional turbojet engine and includes comparisons of thrust and thrust specific fuel consumption.

Referring to FIG. 2 we see a comparison of turbofan or ducted fan engine thrust specific fuel consumption (TSFC) compared to conventional turbojet engine thrust specific fuel consumption and a further comparison of conventional turbojet engine thrust to turbofan engine thrust for the same basic or conventional engine air flow, both plotted against the ratio of ducted fan engine air flow to basic turbojet air flow. Thrust specific fuel consumption is defined as lbs. fuel/lbs. thrust/hour. FIG. 2 represents a curve envelope establishing limits at sea level and at 35,000 feet cruise altitude and clearly demonstrates the increased thrust and reduced fuel consumption available in a ducted fan engine compared to a conventional jet engine. Experience has shown that with a conventional ducted fan engine, the added weight and bulkiness of design required to exceed a ratio of ducted fan air flow to jet engine air flow of approximately 1:1, makes such an engine impractical so that the added advantage of increased thrust and fuel economy by going to flow ratios of 1.5 and 2.0 cannot be obtained practically with conventional ducted fan engine design. As mentioned supra, it is an important object of this invention to teach a turbofan engine construction which permits taking advantage of the increased air flow ratios of 1.5 and 2.0 to obtain increased thrust and fuel economy without sacrificing substantial weight, size and its attendant efficiency reduction, and engine accessibility which is essential to engine service, maintenance and repair.

An embodiment of my ducted fan engine configuration is shown in FIGS. 3, 4 and 5. Engine unit 10 comprises air inlet section 12, plural stage compressor section 14, burner or combustion section 16, and turbine section 18. Compressor 14, burner 16 and turbine 18 are aligned coaxially within engine outer case 20 which is preferably of circular cross section and concentric about engine axis 22. Outer case 20 defines air inlet section 12 at its forward or upstream end, and engine exhaust gas discharge or outlet 24 at its after or downstream end, through which engine exhaust gases are discharged to atmosphere to generate thrust. Engine outer case 20 is made up basically of a first section 20a which is of enlarged diameter with respect to second section 20b, to envelop the enlarged compressor stages 26 and 28 which are located at the forward end of compressor 14, so that the first section 20a defines a first gas passage 30 therewithin. The second section 20b of engine outer case 20 constitutes an axial extension of first section 20a but is of lesser diameter such that an annular aperture 32, which lies substantially in a radial plane is defined therebetween. Second section 20b of outer case 20 defines a second gas passage 34 having an annular inlet 35 which is of substantially the same area as aperture 32 and which culminates in exhaust outlet 24, therewithin. Bifurcated air discharge duct or duct bleed unit 40, which will be described in greater detail hereinafter, is attached to engine outer case 20 by any convenient means such as mating flange units 42 and 44 which may be connected by the conventional nut and bolt method.

With this engine construction, air enters the engine unit 10 at air inlet section 12 with ram boost during flight operation and is compressed by the enlarged compressor stages such as 26 and 28, for example, in passing through first gas passage 30. The compressed gases leaving first gas passage 30 flow in approximately equal proportion either into bifurcated duct unit 40 for discharge to atmosphere therethrough to generate thrust, or into second gas passage 34 in which the gases are further compressed in passing through the remainder of compressor 14, are heated in passing through burner section 16, have energy extracted therefrom in passing through turbine 18 and are eventually discharged to atmosphere through exhaust outlet 24, thereby generating thrust.

Engine unit 10 is preferably constructed in the fashion taught in U.S. Patent Nos. 2,711,631 and 2,747,367, to which reference is hereby made, and differs therefrom basically only in that it has one or more enlarged compressor stages such as 26 and 28 at the compressor forward end, bifurcated duct unit 40, and preferably at least one additional turbine stage to drive the enlarged compressor 14 and an enlarged exhaust outlet 24 to permit increased air flow through the engine with increased turbine operating temperatures.

Bifurcated duct unit 40 is preferably a unitary sheet metal member and comprises an annular inlet section 46 which is defined between outer wall 41 and inner wall 43 and which is attached to engine outer case 20 in sealed relation and positioned and sized to receive the engine compressed gases from the first gas passage 30 which pass through aperture 32. Unit 40 has a smooth exterior and interior and is of short axial dimension or length $l_1$ at its vertical top and bottom position with respect to the corresponding axial dimension or length of engine outlet case 20. Unit 40 is hollow and preferably comprises unobstructed ducts 48 and 50 which are located on opposite and preferably lateral sides of engine unit 10 so as to be in the engine 3 (2 to 4) o'clock and 9 (8 to 10) o'clock positions. Ducts 48 and 50 each smoothly project from annular inlet section 46 rearwardly or downstream and through diverging zones 49 and 51 and culminate in rearwardly directed slot shaped nozzles 52 and 54, respectively. Slots 52 and 54 each have a minor axis 56 (FIG. 10) which extends substantially horizontally and a major axis 58 which extends primarily vertically. The major axis 58 of slots 52 and 54 would preferably extend precisely vertically for maximum noise intensity directivity purposes and will preferably be dimensioned so that the ratio of major axis 58 to minor axis 56 is optimum for noise suppression purposes as fully explained in U.S. application Serial No. 712,418, now Patent Number 3,077,713.

An understanding of the contouring of bifurcated air discharge duct 40 can be obtained by viewing FIGS. 6, 7 and 8. FIG. 6 constitutes a duct showing through station I of FIG. 3 and roughly represents duct annular inlet 32 of area $a_1$ defined between duct outer wall 41 and duct inner wall 43. FIG. 7 represents a showing through station II of FIG. 3, and it will be noted that diametrically opposed equal arc segment duct separations, $A_1$, exist between the two duct segments formed between outer wall 41 and inner wall 43 and which are of total area $a_2$. Area $a_2$ is larger than area $a_1$ to cause the air passing through unit 40 to diffuse and reduce velocity, thereby reducing duct flow losses. FIG. 8 represents a section through station III of FIG. 3 and it will be noted that larger diametrically opposed arc separations, $A_2$, exist between the duct segments defined by outer wall 41 and inner wall 43 and which are of total area $a_3$. Areas $a_3$ and $a_2$ are substantially equal.

A side view of air discharge unit 40 is shown in FIG. 4 while a sectional view is shown in FIG. 5. It will be noted by reference to FIGS. 3, 4 and 5 that unit 40, due to the lateral positioning of ducts 48 and 50 provides virtually complete top and bottom vertical access to engine outer case 20. For field maintenance purposes it is essential that access be had to engine outer case 20 to permit replacement, repair and service of the engine parts located therein. The extremely short axial dimension $l_1$ of unit 40 at the 12 o'clock and 6 o'clock positions is of particular advantage for it permits any convenient engine support or attachment means such as link units 94 to engage engine outer case 20 at mounting flange unit 60, preferably at the 12 (10 to 2) o'clock position and further permits the externally mounted engine accessory unit 62 to be nestled between ducts 48 and 50 while attached to engine outer case 20 at the 6 (4 to 8) o'clock position.

Airplane nacelle 70 is shown in cross section in FIGS. 3, 4 and 5 enveloping engine unit 10 and extending the full length thereof. The nacelle 70, in well-known fashion, is made partially or fully removable externally to permit access to engine 10. Nacelle 70 has air inlet section 72 which corresponds in position with air inlet section 12 of engine 10 to cooperate therewith in defining gas passage 30 and has a hollow interior so that, if desired, it may form ram air cooling gas passage 74 between the exterior of engine outer case 20 and the interior of airplane nacelle 70, through which cooling air is passed to cool such important structural members as the engine outer case 20 and the accessory units 62, lube oil sumps and so forth. In configurations where cooling air passage 74 is not used, vent line 61 runs between engine case 20 and nacelle 70. If cooling air passage 74 is used, ram air enters nacelle air inlet 72, passes over engine outer case first section 20a and unit 40, then over engine outer case second section 20b to be discharged to atmosphere through annular outlet 76 formed between the nacelle outlet 77 and outer case outlet 24. Nacelle 70 is of smooth exterior surface to provide minimum drag in flight and is of any convenient cross-sectional shape to properly engulf or envelop engine unit 10 and will preferably be of substantially oval cross section as shown in FIG. 5 on installations having exterior mounted accessories at the engine 6 (4–8) o'clock position.

FIGS. 9 and 10 illustrate my FIG. 3–5 embodiment installed in a modern aircraft to illustrate how this ducted fan engine configuration lends itself to aerodynamic installation, with maximum utility. Substantially horizontally projecting aircraft wing 90 serves to position and support vertically extending and air foil shaped engine support strut or pylon 92 which projects downwardly therefrom to support engine unit 10 within engine nacelle 70. Since all services furnished engine 10 by the airplane, such as fuel, and all services furnished the airplane by engine 10, such as compressed air for passenger comfort at altitude, passes through vertical strut 92 to wing 90, it is imperative that vertical access exists between strut 92 and engine 10 and such is an important contribution of my invention. In addition to service lines of the type mentioned, engine support means such as link units 94 (FIG. 5) extend in pairs between engine mounting flange unit 60 and engine support strut 92 to permit support of engine 10 by strut 92. In the FIG. 9 and 10 configurations, the exhaust gas discharge section 96 is shown shaped as a vertically extending slot for noise suppression purposes as fully described in U.S. application Serial No. 712,418, now Patent Number 3,027,713, in preference to the usual circular exhaust nozzle 24 shown in the FIG. 3–5 embodiment. My ducted fan engine construction and its substantially vertically extending air discharge slots 52 and 54, particularly when installed in an engine configuration utilizing a vertical engine support strut such as 92, is particularly adaptable to use from a flight aerodynamic and drag reduction standpoint, with the vertical slot exhaust outlet 96, thereby gaining a noise reduction advantage in addition to all other advantages obtained by the use of my ducted fan engine, described supra. It will be noted by viewing FIGS. 9 and 10 that vertical exhaust outlet 96 aligns with vertical strut 92 and smoothly blends in exterior surfaces with strut 92 and engine nacelle 70 so that no drag creating surfaces are formed thereby.

It will be obvious to those skilled in the art that for side mounted engine installations, ducts 48 and 50 may extend along the top and bottom (12 and 6 o'clock) of engine 10 to give lateral (3 and 9 o'clock) access to engine 10. Further, air discharge unit 40 may be fabricated as shown along dotted line 100 of FIG. 3 so that annular inlet 46 joins a single duct such as 50 where installation problems dictate.

It will further be apparent that if conditions dictate, nacelle 70 could be fabricated to completely enclose engine unit 10 and duct unit 40 so that the air from unit 40 discharges within the cavity formed between engine 10 and nacelle 70.

It is to be understood that the invention is not limited to the specific embodiment herein illustrated and described but may be used in other ways without departure from its spirit as defined by the following claims.

I claim:
1. In a jet engine having an axis and an outer housing with an air inlet section at its forward end and an exhaust gas discharge section at its after end, a plural stage compressor and a turbine operatively connected and in spaced axial relation within said housing, a burner between said compressor and turbine within said housing so that air enters said air inlet section, is compressed in passing through said compressor, is heated in passing through said burner, has energy extracted therefrom in passing through said turbine and is discharged through said discharge section to atmosphere as pressurized and heated exhaust gas to generate thrust, said compressor having at least one enlarged stage at its forward end, said outer housing being constructed in first and second sections with said first section having a forward end defining said air inlet section and an after end and being enlarged to envelop said enlarged compressor stage only and defining a first gas passage therewithin and with said second section reduced in radial dimension from said first section and having an after end defining said discharge section and a forward end positioned substantially radially inward of said first section after end so that an annular aperture is defined therebetween and with said second section defining a second gas passage therewithin extending from said enlarged compressor stage to said discharge section, said annular aperture being approximately half the area of said air inlet section, and a hollow bifurcated duct air discharge unit having an annular inlet section attached to said housing aperture and separating immediately into ducts extending axially along opposite sides of said engine to permit access to said outer housing therebetween and each duct culminating in a nozzle through which the air which enters said air discharge unit inlet section from said first gas passage is discharged as pressurized air to generate thrust.

2. In a jet engine having an axis and an outer housing with an air inlet section at its forward end and an exhaust gas discharge section at its after end, a plural stage compressor and a turbine operatively connected and in spaced axial relation within said housing, a burner between said compressor and turbine within said housing so that air enters said air inlet section, is compressed in passing through said compressor, is heated in passing through said burner, has energy extracted therefrom in passing through said turbine and is discharged through said discharge section to atmosphere as pressurized and heated exhaust gas to generate thrust, said compressor having at least one enlarged stage at its forward end, said outer housing being constructed in first and second sections with said first section having a forward end defining said air inlet section and an after end being enlarged to envelop said enlarged compressor stage only and defining a first gas passage therewithin and with second section reduced in radial dimension from said first section and having an after end defining said discharge section and a forward end positioned substantially radially inward of said first section after end so that an annular aperture is defined therebetween and with said second section defining a second gas passage therewithin extending from said enlarged compressor stage to said discharge section, a hollow bifurcated duct unit having an annular inlet section attached to said housing aperture and separating into ducts positioned on laterally opposite sides of said engine to permit access to said outer housing from vertically above and below through the areas between said ducts and each duct culminating in a nozzle through which the air which enters said annular inlet section of said bifurcated duct from said first gas passage is discharged as pressurized air to generate thrust, a nacelle engulfing said engine and extending the full length thereof to define a cooling air passage between said engine and said nacelle, engine accessories located within said cooling air passage and between said ducts and attached to the bottom of said outer housing, and engine supporting means extending through said nacelle and attached to the top of said outer housing between said ducts.

3. An aircraft having a wing and a vertically extending engine support strut projecting downwardly therefrom, an engine nacelle located at the downward end of said strut and having a hollow interior and a smooth exterior, a jet engine enveloped within said nacelle interior and having an axis and an outer housing with an air inlet section at its forward end and an exhaust gas discharge section projecting rearwardly beyond and blending smoothly with said nacelle and culminating in a vertically extending slot aligning with said strut at its after end, a plural stage compressor and a turbine operatively connected and in spaced axial relation within said housing, a burner between said compressor and turbine within said housing so that air enters said air inlet section, is compressed in passing through said compressor, is heated in passing through said burner, has energy extracted therefrom in passing through said turbine and is discharged through said discharge section to atmosphere as pressurized and heated exhaust gas to generate thrust, said compressor having at least one enlarged stage at its forward end, said outer housing being constructed in first and second sections with first section having a forward end defining said air inlet section and an after end and being enlarged to envelop said enlarged compressor stage only and defining a first gas passage therewithin and with second section reduced in radial dimension from said first section and having an after end defining said discharge section and a forward end positioned substantially radially inward of said first section after end so that an annular aperture is defined therebetween and with said second section defining a second gas passage therewithin extending from said enlarged compressor stage to said discharge section, said annular aperture being approximately half the area of said air inlet section, a hollow bifurcated duct bleed unit which is divergent at its upstream end and having an annular inlet section attached to said housing aperture and separating into ducts positioned on laterally opposite sides of said engine and extending substantially the full length thereof and permitting access to said outer housing from vertically above and below through the areas between said ducts and each duct culminating in a nozzle communicating with atmosphere and defining a substantially vertically extending slot through which the air which enters said bleed unit inlet section from said first gas passage is discharged as pressurized air into said cooling air passage for discharge through said cooling air passage outlet to generate thrust, engine accessories located within said cooling air passage and between said ducts and attached to the bottom of said outer housing, and engine support means attached to said strut and attached to the top of said outer housing between said ducts.

4. In a jet engine having an axis and an outer housing with an air inlet section at its forward end and an exhaust gas discharge section at its after end, a plural stage compressor and a turbine operatively connected and in spaced axial relation within said housing, a burner between said compressor and turbine within said housing so that air enters said air inlet section, is compressed in passing through said compressor, is heated in passing through said burner, has energy extracted therefrom in passing through said turbine and is discharged through said discharge section to atmosphere as pressurized and heated exhaust gas to generate thrust, said compressor having at least one enlarged stage at its forward end, said outer housing being constructed in first and second sections with said first section having a forward end defining said air inlet section and an after end and being enlarged to envelop said enlarged compressor stage only and defining a first gas passage therewithin and with said second section reduced in radial dimension from said first section and having an after end defining said discharge section and a forward end positioned substantially radially inward of said first section after end so that an annular aperture is defined therebetween and with said second section defining a second gas passage therewithin extending from said enlarged compressor stage to said discharge section, said annular aperture being approximately half the area of said air inlet section, and a hollow duct air discharge unit having an annular inlet section attached to said housing aperture and separating immediately into at least one duct extending axially along said engine to permit access to said outer housing and each such duct culminating in a nozzle through which the air which enters said air discharge unit inlet section from said first gas passage is discharged as pressurized air to generate thrust.

References Cited in the file of this patent

UNITED STATES PATENTS

| 1,949,041 | Lagabbe | Feb. 27, 1934 |
| 2,458,600 | Imbert et al. | Jan. 11, 1949 |
| 2,580,591 | Pouit | Jan. 1, 1952 |
| 2,664,700 | Benoit | Jan. 5, 1954 |
| 2,680,346 | Michael | June 8, 1954 |
| 2,781,634 | Moore | Feb. 19, 1957 |

FOREIGN PATENTS

| 672,660 | Great Britain | May 21, 1952 |
| 744,196 | Great Britain | Feb. 1, 1956 |

OTHER REFERENCES

Jane's All The World's Aircraft (1955–1956), p. 225.
Journal of the Helicopter Assn. of Great Britain, volume 9, No. 3, January 1956, pages 404–410.